United States Patent [19]

Höhner et al.

[11] Patent Number: 5,233,542

[45] Date of Patent: Aug. 3, 1993

[54] METHOD AND CIRCUIT CONFIGURATION FOR FORMING AN EVALUATION SIGNAL FROM A PLURALITY OF REDUNDANT MEASUREMENT SIGNALS

[75] Inventors: Herbert Höhner, Neu Anspach; Jürgen Kesberg, Nidderau, both of Fed. Rep. of Germany

[73] Assignee: Nord-Micro Electronik Feinmechanik AG, Frankfurt am Main, Fed. Rep. of Germany

[21] Appl. No.: 575,383

[22] Filed: Aug. 29, 1990

[30] Foreign Application Priority Data

Aug. 29, 1989 [DE] Fed. Rep. of Germany ....... 3928456

[51] Int. Cl.$^5$ .............................................. G06F 11/16
[52] U.S. Cl. .............................. 364/551.01; 364/434; 364/433; 364/184
[58] Field of Search ............... 364/551.01, 550, 433, 364/552, 424.01, 424.06, 434, 184; 371/67.1, 68.1, 68.3; 340/508

[56] References Cited

U.S. PATENT DOCUMENTS

| | | | |
|---|---|---|---|
| 3,667,057 | 5/1972 | Pfersch, Jr. et al. | 371/67.1 |
| 4,327,437 | 4/1982 | Gelderloos | 371/68.3 |
| 4,414,540 | 11/1983 | Dickenson | 340/508 |
| 4,644,538 | 2/1987 | Cooper et al. | 371/68.1 |
| 4,761,748 | 8/1988 | Le Rat et al. | 364/551.01 |
| 4,794,376 | 12/1988 | Lloyd, Jr. et al. | 340/508 |
| 4,797,670 | 1/1989 | Joyner | 340/508 |
| 5,001,638 | 3/1991 | Zimmerman et al. | 371/67.1 |
| 5,004,998 | 4/1991 | Horii | 364/551.01 |

Primary Examiner—Thomas G. Black
Assistant Examiner—Michael Zanelli
Attorney, Agent, or Firm—Herbert L. Lerner; Laurence A. Greenberg

[57] ABSTRACT

A method for forming an evaluation signal (YM) representing a measurement value comprises the steps of obtaining a plurality of measurement signals (X1, X2, X3, X4) from a plurality of sensors detecting measurement values within a time interval, preferably simultaneously; supplying each measurement signal (X1, X2, X3, X4) to a plurality of evaluation units; and forming an evaluation signal (YM1, YM2, YM3, YM4) in accordance with an evaluation algorithm with each evaluation unit. A circuit configuration for forming an evaluation signal (YM) in accordance with an evaluation algorithm from a plurality of measurement signals (X1, X2, X3, X4) comprises: a plurality of sensors detecting the measurement value within a time interval, preferably simultaneously, and generating the measurement signals, an evaluation unit, and, advantageously, a confirmation unit and a consolidation unit, the units forming a single aggregate unit. The plurality of evaluation units each form one evaluation signal (YM1, YM2, YM3, YM4) in accordance with the evaluation algorithm from the measurement signals (X1, X2, X3, X4).

78 Claims, 3 Drawing Sheets

METHOD AND CIRCUIT CONFIGURATION FOR FORMING AN EVALUATION SIGNAL FROM A PLURALITY OF REDUNDANT MEASUREMENT SIGNALS

The invention relates to a method and a circuit configuration for forming an evaluation signal representing a measurement value or variable in accordance with an evaluation algorithm from a plurality of measurement signals, which are obtained by means of a plurality of sensors detecting the measurement variable within a time interval, in particular simultaneously.

The redundant detection of measurement values is significant in fields in which particularly high accuracy and reliability are crucial, for reasons of safety or economy. Automotive engineering and, particularly pertinent in the instant application, aviation engineering, are such fields.

Redundancy is defined in the instant application as, firstly, multiple detection of a measurement value (for instance, a flight parameter actual value, or a control command signal) by means of a plurality of sensors, and also means generating a plurality of measurement signals representing the measurement variable. In the normal case, the number of measurement signals corresponds to the number of sensors. However, several measurement signals may be derived from a single sensor, and/or one signal from a single sensor may be transmitted to a plurality of measurement lines. The latter could be contemplated for backup and safety reasons. Multiple detection of the measurement variable is effected within a time interval so short that within it the measurement variable varies only insignificantly, or in other words only within the resolution capacity of the sensors. This definition is meant to include both simultaneous and successive sampling.

Redundancy increases the probability that a measurement value true to the measurement variable will be available. On the other hand, a decision problem arises from the phenomenon, unavoidable in actual situations, that the measurement signals which are intended to represent one and the same measurement signal will deviate from one another at least somewhat. This is possible even if the system is free of malfunction. The measurement signals must accordingly be evaluated by an evaluation algorithm, in order to form an evaluation signal that can then be further processed.

Under difficult conditions and when an extremely high standard of safety is required, however, it may happen that a simple evaluation of this kind may not be reliable enough.

Time savings in control systems, such as flight control systems, play a crucial role when the real-time requirements of the system to be provided with the measurement signal are high. In flight control systems, for example, hundreds of parameter data must be detected and evaluated up to 640 times a second, to enable modern aircraft performance and controllability. The running time of processing algorithms represent a decisive limit for many more advanced uses and development plans.

It is accordingly an object of the invention to provide a method and circuit configuration for forming an evalution signal from a plurality of redundant measurement signals, which overcomes the hereinafore-mentioned disadvantages of the heretofore-known methods and devices of this general type, assuring a more reliable evaluation of redundant measurement signals.

With the foregoing and other objects in view there is provided, in accordance with the invention, a method for forming an evaluation signal representing a measurement value, which comprises the steps of obtaining a plurality of measurement signals from a plurality of sensors detecting measurement values within a time interval, supplying each measurement signal to a plurality of evaluation units, and forming an evaluation signal in accordance with an evaluation algorithm with each evaluation unit.

By evaluating the measurement signals in this way, the advantage is attained that the evaluation of the measurement signals takes place redundantly in a plurality of channels, and is therefore more reliable and more accurate.

In accordance with another feature of the invention, filtered measurement signals are formed from the measurement signals prior to forming the evaluation signal. In this way, the evaluation becomes less sensitive to abrupt changes of a measurement signal, as can happen in the event of defects (for instance line breakage, grounding or sensor failure). Besides this protection against transient values in the evaluation signal, filtering also serves to block out noise in the measurement signals.

In accordance with further features of the invention, certain measurment signals may be excluded from the evaluation algorithm and preferably marked as error signals, if over a predetermined period of time their value falls out of a given value range, i.e. it exceeds a maximum value or drops below a minimum value and/or deviates by more than a maximally allowable differential value from an evaluation signal. Conversely, a measurement signal can be taken into account again if it no longer exceeds the aforementioned limits.

A system behaving by these criteria thus configures itself to the number of active channels that can be taken into account, and it prevents falsification, by abnormal measurement signals, of the outcome of measurement and evaluation.

The evaluation signals obtained from and present at the output of the evaluation units can be supplied directly to further processing, such as redundant processing units for solving equations such as a motion equation.

In accordance with an added feature of the invention, for reasons of reliability and safety, the plurality of redundantly available evaluation signals are compared among each other or to already confirmed evaluation signals. In the normal case, of course, the evaluation signals are equal. After the comparison, a value which is considered particularly reliable is selected therefrom to assure that processing units disposed downstream will operate (compute) with one and the same input value. It is accordingly provided with the invention that each evaluation signal is delivered to a plurality of confirmation units, and each of these confirmation units forms a confirmed evaluation signal in accordance with one and the same confirmation algorithm.

In accordance with an additional feature of the invention, certain evaluation signals are excluded from the confirmation algorithm and preferably marked as error signals, in order to avoid favoring incorrect confirmations. Values are excluded, if over a predetermined period of time their value exceeds a maximum value or drops below a minimum value and/or deviates by a maximal allowable difference value from an earlier confirmed evaluation signal.

A system behaving by these criteria thus configures itself to the number of active channels that can be taken into account, and it prevents falsification, by abnormal evaluation signals, of the outcome of confirmation. The confirmed evaluation signals are delivered each to one processing unit, each for producing one output signal, in particular a control signal.

These output signals may be delivered each to one final control element (actuator) for setting a control variable. For reasons of reliability and safety, it is provided, however, in accordance with again another feature of the invention, to compare the redundant evaluation signals, which are present in plural form and which are normally equal, to select from them a value considered particularly reliable, and to assure that processing stages disposed downstream will operate (compute) with one and the same input value.

In accordance with again a further feature of the invention, each output signal is supplied to a plurality of consolidation units, and each of these consolidation units forms a consolidated output signal in accordance with one and the same consolidation algorithm.

To avoid favoring the creation of incorrect consolidations, it is provided, in accordance with again an added feature of the invention, that output signals are excluded from the consolidation algorithm and preferably marked as error signals, if over a predetermined period of time their value falls outside a certain value range, i.e. it exceeds a maximum value or drops below a minimum value and/or deviates by a maximal allowable difference value from a consolidated output signal.

A system behaving by these criteria thus configures itself to the number of active channels that can be taken into account, and it prevents a falsification, by abnormal output signals, of the outcome of consolidation.

The consolidated output signals are supplied each to one final control element (actuator) for setting a control variable. Consolidation is particularly advantageous if for reasons of redundancy a plurality of actuators set one and the same control variable: different control signals would cause the actuators to work against each other, allowing them to impair or damage one another.

To shorten the time between detection of measurement variables and output of control signals, in particular to economize the dead time or idle time for receiving the measurement signals and possibly for relief of a master computer belonging to a redundancy channel, it is particularly important, and accordingly provided with another feature of the invention, to enable the evaluation of the redundant measurement signals, confirmation of the redundant evaluation signals, and/or the consolidation of the redundant output signals to be performed by means of a specialized hardware circuit, preferably a user-specific integrated circuit.

These features provided with the invention regarding the acceleration of the redundant measurement signal evaluation and processing are particularly emphasized. Time saving plays an even greater role, when the real-time requirements of the system to be provided with the measurement signal are high. In flight control systems, for example, hundreds of parameter data must be detected and evaluated up to 640 times a second, to enable modern aircraft performance and controllability.

With the objects of the invention in view there is also provided a circuit configuration for forming an evaluation signal representing a measurement variable in accordance with an evaluation algorithm from a plurality of measurement signals, comprising a plurality of sensors detecting the measurement variable within a time interval, preferably simultaneously, and generating the measurement signals, a plurality of evaluation units each forming one evaluation signal in accordance with the evaluation algorithm from the measurement signals.

In accordance with yet another feature of the invention, the circuit configuration includes an evaluation unit, a certification or confirmation unit, a processing unit and a consolidation unit. All of the units include means for excluding certain signals from their inherent operations, and to use a given algorithm to produce a new signal from the ones which were not excluded from the algorithm.

In accordance with still a further feature of the invention, the circuit configuration includes a vote accelerator in the form of a specialized circuit configuration, such as a user-specific integrated circuit. The circuit may be a hard-wired analog, digital or mixed signal circuit.

In accordance with yet an additional feature of the invention, the vote accelerator is connected with a master computer, such as a flight control computer (FCC) of an aircraft, yet is laid out to be able to perform all of the functions called for in the method and circuit configuration, such as evaluation, confirmation and/or consolidation functions, independently or autonomously of the master computer.

Other features which are considered as characteristic for the invention are set forth in the appended claims.

Although the invention is illustrated and described herein as embodied in a method and circuit configuration for forming an evaluation signal from a plurality of redundant measurement signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
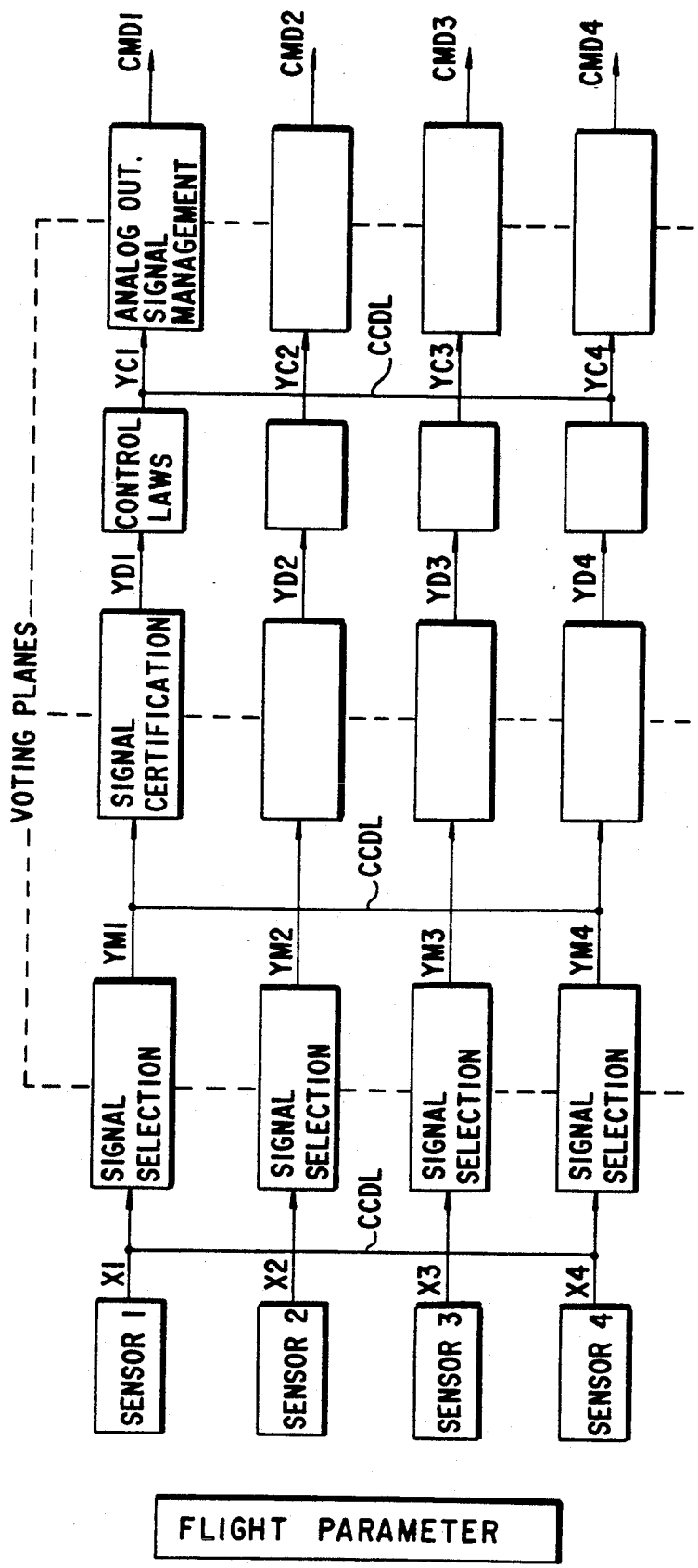
FIG. 1 is a schematic view of the evaluation, confirmation and consolidation planes of a system having four parallel channels, i.e. triple redundancy.

Referring now to the figures of the drawings in detail, and more particularly to FIG. 1 thereof, there is illustrated a method and circuit configuration according to the invention for forming a signal, dependent on a measurement signal, by an algorithm from a plurality of measurement signals X1, X2, X3, X4, which are obtained from a plurality of sensors detecting the measurement variable within a time interval, and in particular, simultaneously.

A system having three decision stages or voting planes is shown, namely:
an evaluation plane (signal selection),
a confirmation plane (signal certification); and
a consolidation plane (signal management).
These three voting planes are arranged in four parallel channels, which in effect affords triple redundancy.

A processing plane is disposed between the confirmation plane and the consolidation plane. In the processing plane (redundantly) confirmed measurement values are redundantly processed, for instance in motion and/or control equations (control laws) for an aircraft are used in order to generate redundant control signals.

More than triple redundancy has not yet been required in the industry thus far. However, if needed it can be handled along the pattern of the instant disclosure.

A measurement value, which may for instance be a flight parameter value or a control command signal, is detected by means of four non-illustrated sensors. The measurement value or variable is in the form of four parallel measurement signals X1, X2, X3, X4 at the input to the system. This system may, for instance, be a flight control system.

In the embodiment shown in FIG. 1, the system is laid out such that unless there is a malfunction, it operates routinely with four channels. This may for instance mean that the measurement signals X1, X2, X3, X4 of four parallel flight control computers, or of four specialized circuit configurations subordinate to these flight control computers, are processed.

In the case of a malfunction, the various voting planes can have different redundancy. It is also possible, however, that during normal operation, i.e. in the absence of a malfunction, various planes can have different redundancy.

The redundant processing increases the reliability of the processing operation to such an extent that a system equipped in this way becomes error-tolerant. For example, in a redundant flight control system, defective sensors and actuators are handled or tolerated in such a way that their defective operation has no negative effects on flight control.

Exploiting the redundancy, however, requires decision algorithms suitable for this purpose. In the embodiment shown in FIG. 1, each measurement signal X1, X2, X3, X4 is supplied in a first stage or voting plane to four evaluation units for signal selection, and each of these evaluation units forms an evaluation signal YM1, YM2, YM3, YM4 by means of an evaluation algorithm described in greater detail hereinafter. These evaluation signals are normally identical to one another.

The main advantage attained with this kind of exploitation of the measurement signals X1, X2, X3, X4 is that the measurement signals are evaluated redundantly in four channels and the evaluation, accordingly, is more reliable and more tolerant of error.

If all four measurement signals X1, X2, X3, X4 are usable, the evaluation algorithm advantageously ignores the smallest and largest of the usable measurement signals, and forms a mean value from the two measurement signals in between. The mean value or average may be in the form of a linear or arithmetic mean or a weighted mean value.

If three of the measurement signals X1, X2, X3, X4 are usable, then the evaluation algorithm advantageously ignores the smallest and the largest of the usable measurement signals, and the evaluation signal (YM1, YM2, YM3 or YM4) is formed from the measurement signal in between. In particular, this measurement signal is directly chosen as the evaluation signal.

If two measurement signals are usable, the evaluation algorithm advantageously takes a mean, for instance the linear mean value, from the two measurement signals.

If only one measurement signal is usable, the evaluation algorithm forms the evaluation signal from this measurement signal by selecting it directly as the evaluation signal. The inclusion of this basic variant in the definition of the configuration is advantageous because in this way the flow of the course of the method can be retained both in the evaluation stage and in subsequent stages.

In an advantageous embodiment of the invention, the measurement signals X1, X2, X3, X4 are filtered in analog or digital fashion prior to their evaluation. Accordingly, the evaluation becomes less sensitive to abrupt changes in a measurement signal, such as those typically occurring in malfunctions, such as line breakage, grounding, sensor failure, and so forth. Besides providing this protection against falsifying transient values, filtering also serves to block out undesired noise components in the measurement signals X1, X2, X3, X4.

A filtering process—advantageously digital—may include the following procedure: Let $Xn(t)$ be the unfiltered measurement signal of the nth channel (n=1, 2, 3, 4) of a given time interval t. From the unfiltered measurement signals X1(t), X2(t), X3(t), X4(t), one evaluation signal (mean) XM(t) is formed by the above-defined evaluation algorithm. Also, $Zn(t)$ (n=1, 2, 3, 4) be a filter value. Let $Yn(t)$ be the filtered measurement signals of the nth channel (n=1, 2, 3, 4) of a given time interval, which is formed recursively by the equation, $$Yn(t) = Xn(t) - Zn(t),$$

in which $$Zn(t+1) = Zn(t) + K[Yn(t) - XM(t)]$$

where
$Zn(0) = 0$ and K is a constant (less than 1), which may be different for each set of sensors.

Measurement signals X1, X2, X3, X4 (unfiltered) or Y1, Y2, Y3, Y4 (filtered) can be excluded from the evaluation algorithm and marked as error signals in a status matrix, for instance, if their amount over a given period of time exceeds a maximum value or drops below a minimum value and/or deviates from an evaluation signal YM1, YM2, YM3, YM4 by more than a maximum allowable differential amount. Conversely, a measurement signal can be included in the evaluation again if it no longer falls outside the above limits.

A system behaving by these criteria thus configures itself to the number of active channels that can be taken into account, and it prevents falsification, by abnormal measurement signals, of the outcome of measurement and evaluation.

Even the evaluation signals YM1, YM2, YM3, YM4 each present at the output of the evaluation units can be supplied to further processing, such as redundant processing units for solving a motion equation (control laws).

For reasons of reliability and safety, it is preferable, however, to compare the redundant evaluation signals YM1, YM2, YM3, YM4, a plurality of which is present and which are normally equal, in turn. From these redundant evaluation signals, a value may be selected which is considered particularly reliable. This assures that processing units disposed downstream thereof will base their computations on one and the same input value.

To this end, it is provided in the present embodiment that each evaluation signal YM1, YM2, YM3, YM4 is delivered via a cross channel data link CCDL, to four confirmation or signal certification units, and each of these confirmation units forms a confirmed evaluation signal YD1, YD2, YD3, YD4 in accordance with one and the same confirmation algorithm. The evaluation signals YM1, YM2, YM3, YM4 are preferably not filtered here, because—in contrast to the sensor signals X1, X2, X3, X4—they are identical in the normal case, and possible deviations from one another should not be masked but instead be used as error indicators.

To avoid promoting the creation of incorrect confirmations, it is preferably provided that one or optionally more evaluation signals YM1, YM2, YM3, YM4 are excluded from the confirmation algorithm, and preferably the channel or channels affected are marked as defective in a status matrix, if over a predetermined period of time their value exceeds a maximum value or drops below a minimum value and/or deviates from a confirmed evaluation signal YD1, YD2, YD3, YD4 by a maximum allowable differential.

A system behaving by these criteria thus configures itself to the number of active channels that can be taken into account, and it prevents falsification of the outcome of confirmation YD1, YD2, YD3, YD4 due to abnormal evaluation signals, YM1, YM2, YM3, YM4.

If two or more equal evaluation signals YM1, YM2, YM3, YM4 are present, then the confirmation algorithm advantageously forms from them, in particular from the first two equal evaluation signals YM1, YM2, YM3, YM4, a confirmed evaluation signal YD1, YD2, YD3 or YD4. The algorithm selects one of the equal evaluation signals YM1, YM2, YM3, YM4 as the confirmed evaluation signal YD1, YD2, YD3 or YD4.

In the presence of two pairs of equal evaluation signals YM1, YM2, YM3, YM4, where the values of the pairs differ from one another—this is known as the so-called schizophrenic state—the confirmation algorithm advantageously forms a confirmed evaluation signal YD1, YD2, YD3 or YD4 in a predetermined, defined manner from one or the other pair. Thus, one of the equal evaluation signals YM1, YM2, YM3, YM4 is selected as the confirmed evaluation signal YD1, YD2, YD3 or YD4, or a mean value or average is taken, or the like.

The algorithmic treatment of the schizophrenic state must be defined, in order to avoid possible fatal blockage or some other chaotic situation in the confirmation stage.

In the absence of two equal evaluation signals YM1, YM2, YM3, YM4, the confirmation algorithm advantageously retains the most recently confirmed evaluation signal YD1, YD2, YD3 or YD4 in the corresponding channel, for safety reasons.

Advantageously, only after confirmation are the evaluation signals supplied to one processing unit (control laws) each in the form of YD1, YD2, YD3, YD4, respectively, for producing one output signal YC1, YC2, YC3, YC4, each, in particular a control signal.

The output signals YC1, YC2, YC3, YC4 could each be supplied to a corresponding final control element (actuator) for controlling a control variable. In the present embodiment, however, it is preferable to compare the redundant (multiply present and normally equal) output signals YC1, YC2, YC3, YC4 among each other, to select one value from them that is considered particularly reliable. It is thus assured that subsequent further processing stages, such as final control elements or actuators, work or control on the basis of one and the same input value.

To this end, it is provided in the embodiment illustrated in FIG. 1 that each output signal YC1, YC2, YC3, YC4 is supplied via a cross channel data link CCDL to four consolidation units (signal management), and each of these consolidation units forms one consolidated output signal CMD1, CMD2, CMD3 or CMD4, by one and the same consolidation algorithm. In this process the output signals YC1, YC2, YC3, YC4 are preferably not filtered, because—in contrast to the sensor signals X1, X2, X3, X4—they are identical in the normal case, and, as in the case of YM1, YM2, YM3, YM4, possible deviations from one another should not be masked but instead be used as error indicators.

To avoid promoting the creation of incorrect consolidations, it is preferably provided that output signals YC1, YC2, YC3, YC4 are excluded from the consolidation algorithm and affected channels are marked as defective in a status matrix, if over a predetermined period of time the amount of an output signal YC1, YC2, YC3, YC4 exceeds a maximum value or drops below a minimum value and/or deviates by a maximum allowable differential from a consolidated output signal CM1, CM2, CM3, CM4.

A system behaving by these criteria thus configures itself to the number of active channels that can be taken into account, and it prevents falsification or the resulting consolidation signals CMD1, CMD2, CMD3, CMD4, due to abnormal output signals, YC1, YC2, YC3, YC4 from the control laws processing.

If two or more equal output signals YC1, YC2, YC3, YC4 are present, then the consolidation algorithm advantageously forms from them—in particular from the first two equal output signals YC1, YC2, YC3, YC4—a consolidated output signal CMD1, CMD2, CMD3 or CMD4. One of the equal output signals YC1, YC2, YC3, YC4 is selected as the consolidated output signal CMD1, CMD2, CMD3 or CMD4.

In the presence of two pairs of equal value among the output signals YC1, YC2, YC3, YC4, again the schizophrenic state, the consolidation algorithm advantageously forms a consolidated output signal CMD1, CMD2, CMD3 or CMD4 in a predetermined, defined manner from one or the other pair. For example, one of the equal output signals YC1, YC2, YC3, YC4 may be selected as the consolidated output signal CMD1, CMD2, CMD3 or CMD4, or an average may be formed, or a similar procedure may be chosen.

As in the case of the certified signals YDn, the algorithmic treatment of the schizophrenic state must be defined, in order to avoid possible fatal blockage or some other chaotic situation in the consolidation stage.

In the absence of two of equal output signals YC1, YC2, YC3, YC4, the consolidation algorithm advantageously retains the most recently consolidated output signal CMD1, CMD2, CMD3 or CMD4 in the corresponding channel as a precaution.

Advantageously, only the consolidated output signals CMD1, CMD2, CMD3, CMD4 are each supplied to a non-illustrated final control member (actuator) for controlling a control variable. This is particularly advantageous if, for reasons of redundancy, a plurality of control variables control one and the same control actuator. Different control signals are then to be avoided if at all possible, because such control signals would cause the control members to work against each other and to impair or damage one another.

The functions of the evaluation plane, confirmation plane and consolidation plane, which are each located in a common redundancy channel, can be performed successively in an aggregate unit (vote accelerator). This aggregate unit may for instance be a master computer—such as a flight control computer FCC—belonging to a corresponding redundancy channel.

On the other hand, to minimize the duration between the detection of a measurement variable (measurement signals X1, X2, X3, X4) and the output of a corresponding control signal (consolidated output signals CMD1, CMD2, CMD3, CMD4), and furthermore to relieve a master computer belonging to a redundancy channel, it may be particularly important for the evaluation of the redundant measurement signals X1, X2, X3, X4, the confirmation of the redundant evaluation signals YM1, YM2, YM3, YM4, and/or the consolidation of the redundant output signals YC1, YC2, YC3, YC4 to be performed by means of a specialized hardware circuit, preferably a customized integrated circuit. Fast digital control loop closure is thus provided.

Figure 2:
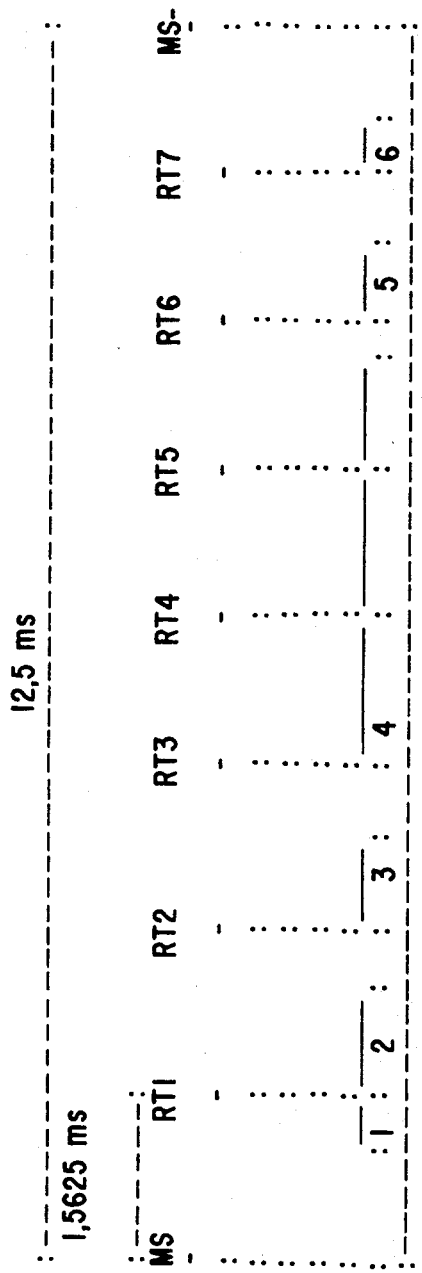
FIG. 2 is a diagrammatic view illustrating the utilization of time in a channel lacking a specialized aggregate unit.

In this respect, FIG. 2 shows how time is utilized in a channel without a specialized aggregate unit, i.e. in a channel in which an associated master computer itself performs the evaluation, confirmation and consolidation functions. The observation extends over a period of time of 12.5 milliseconds (ms), which here is defined by macrosynchronization signals MS and is subdivided by real time markers RTi (RT=real time; i=1, 2, ... 7) into segments of 1.5625 ms each.

In the bottom line of the diagram, increasing arabic numerals designate successive operating phases, the time length of which is illustrated by solid horizontal lines.

The various phases thus represented are as follows:
1—reading-in the measurement signals X1, X2, X3, X4;
2—generating the evaluation signals YM1, YM2, YM3, YM4;
3—producing the confirmed evaluation signals YD1, YD2, YD3, YD4;
4—producing the output signals YC1, YC2, YC3, YC4;
5—producing the consolidated output signals CMD1, CMD2, CMD3, CMD4;
6—outputting the consolidated output signals CMD1, CMD2, CMD3, CMD4.

As can be seen, there is dead or idle time, intrinsic to the computer, of 4.6875 ms, or 3×1.5625, between the read-in of the measurement signals X1, X2, X3, X4 and the start of the processing of the confirmed evaluation signals YD1, YD2, YD3, YD4. In other words, there is a lag before the actual computation with the measurement variable can begin, for instance in the context of open- and closed-loop control laws for an aircraft. The more complex these calculations, the more time they require and thus the more probable it is that this dead time acts as a bottleneck for further refinement of the applicable control. In the embodiment illustrated in FIG. 2, precisely 4.6875 ms is available for the control law calculations.

Figure 3:
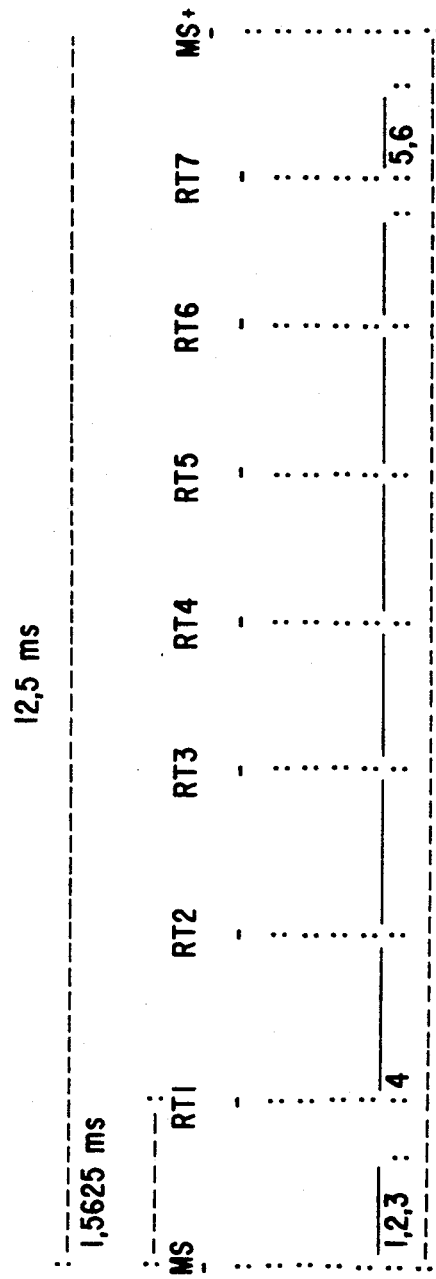
FIG. 3 is a diagrammatic view illustrating the utilization of time in a channel having a specialized aggregate unit.

By comparison, FIG. 3 shows the time distribution in a channel with a specialized aggregate unit, in other words in a channel in which a circuit configuration for performing the evaluation, confirmation and consolidation functions is coordinated with the master computer corresponding to the channel, as described in further detail hereinafter. As in FIG. 2, the period of observation is 12.5 milliseconds (ms), which is defined by macrosynchronization signals MS and is subdivided by real time markers RTi (RT=real time; i=1, 2, ... 7) into segments of 1.5625 ms.

Once again in the bottom line of the diagram, increasing arabic numerals designate successive operating phases, as defined above in the context of FIG. 2. The length of the periods of time of each phase is illustrated by solid horizontal lines.

As can be seen, the dead time between the read-in of the measurement signals X1, X2, X3, X4 and the start of phase 3, during which the confirmed evaluation signals YD1, YD2, YD3, YD4 are processed, i.e. the beginning of the actual computation with the measurement variable, now amounts to only 1.5625 ms. Furthermore, in autonomous operation of the specialized circuit configuration, phase 5 (generation of the consolidated output signals CMD1, CMD2, CMD3, CMD4) now requires 1.5625 ms less time.

Thus 9.375 ms are available as computation time for performing the control law calculation, or in other words twice as much as in the embodiment of FIG. 2.

Figure 4:
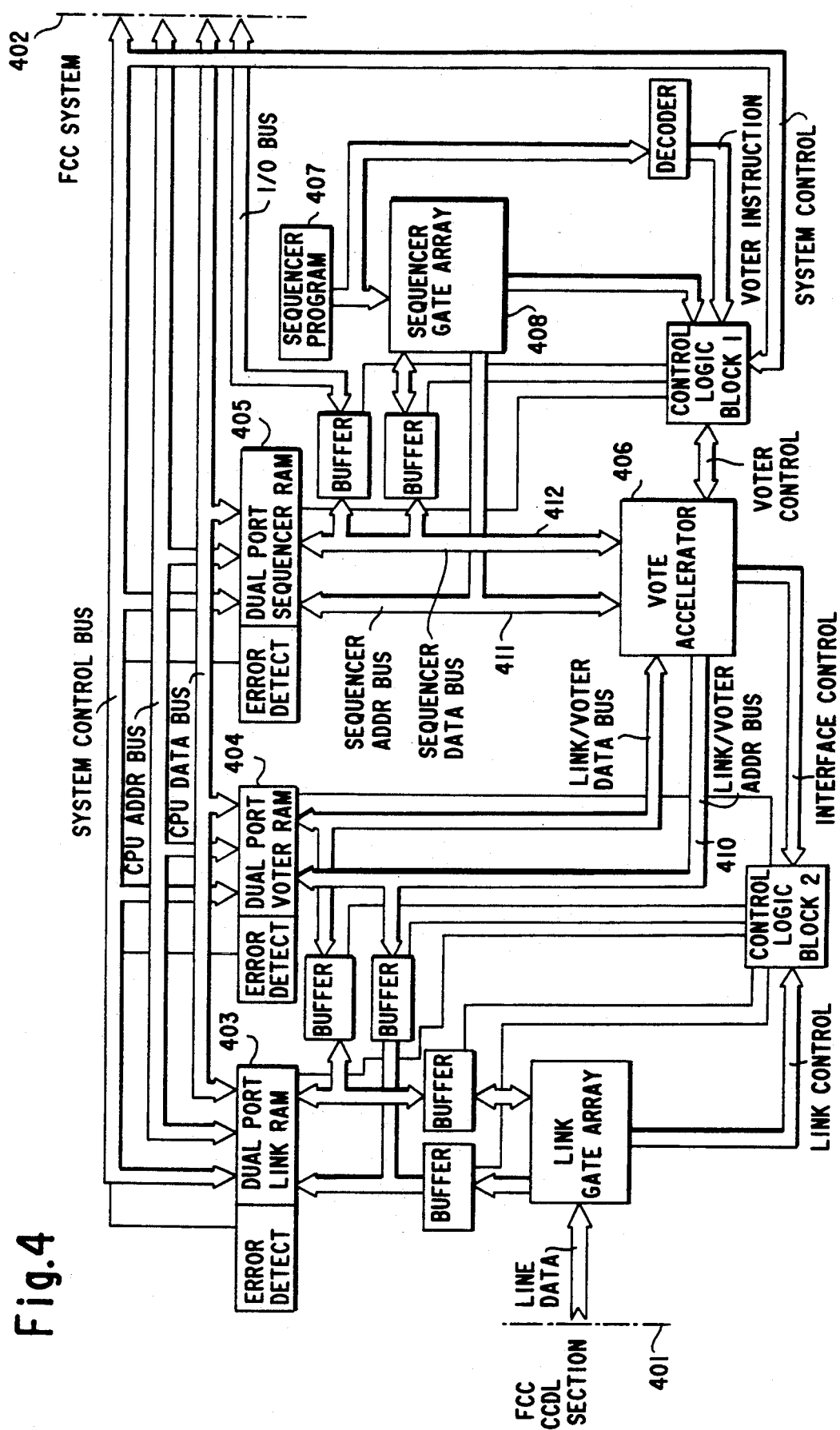
FIG. 4 is a schematic view of a specialized aggregate unit for performing the evaluation, confirmation and consolidation algorithms of a channel.

Referring now to FIG. 4, there is seen a schematic illustration of a specialized aggregate unit 406 (vote accelerator) for performing the evaluation, confirmation and consolidation algorithms of a (redundant) channel. The embodiment of FIG. 4 represents an example for how the specialized circuit configuration 406 (vote accelerator) is connected to input/output interfaces 401, 402, memory unit 403, 404, 405, and above all a so-called sequencer control unit 408.

The interfaces shown in FIG. 4 are, firstly, a cross channel data link CCDL 401 indicated by a dash-dotted line, and, secondly, to bus connections 402 to a flight control computer FCC, on which the present embodiment is based, of the given redundant channel.

The memory units shown (link RAM 403, voter RAM and sequencer RAM 404) are read-write memories (dual port RAMs) each having two inputs and outputs for memory access, so that both the specialized circuit configuration or vote accelerator 406 and the flight control computer FCC can have access to the voter RAM and sequencer RAM memories 404, 405.

The sequencer control unit 408 includes a sequencer program 407, which autonomously of the flight control computer FCC controls the specialized circuit configuration "vote accelerator"407. This means that no activities of the processor used on the flight control computer FCC are needed for the various phases, such as read-in of measurement signals X1, X2, X3, X4, changing of redundant channels, performing algorithmic evaluation, confirmation, or consolidation, and so forth.

The sequencer control unit 408 periodically effects the read-in of the measurement signals X1, X2, X3, X4 into the sequencer RAM memory 405. In the present embodiment, this is done at the beginning of each macro time period of 12.5 ms. Immediately thereafter, these measurement signals are distributed to all the other non-illustrated channels by means of a first data transmission via the cross channel data link CCDL 401 into the non-illustrated corresponding link RAM memories.

Simultaneously, the specialized vote accelerator circuit configuration receives a control instruction from the sequencer control unit to read in the measurement signals out of the link RAM memory 403 and to work the evaluation algorithm. The result of this evaluation (YM1, for instance) is written into the sequencer RAM memory 405 for distribution to all channels.

Now, at the impetus of the sequencer control unit 408, the distribution of the evaluation signals YM1, YM2, YM3, YM4 calculated in the various channels to all the channels takes place by means of a second data transmission via the cross channel data link CCDL 401. The result is a new entry into the link RAM memory 403 of each channel, from whence the particular specialized vote accelerator circuit configuration 406 retrieves the data for working the confirmation algorithm. This algorithm is then begun immediately.

The (normally identical) confirmation results YD1, YD2, YD3, YD4 of the various channels are subsequently available in the voter RAM memory 404 belonging to each applicable channel, for the subsequent redundant control law calculation.

After the output signals YC1, YC2, YC3, YC4 have been calculated, the consolidated output signals CMD1, CMD2, CMD3, CMD4 are evaluated following a third data transmission via the cross channel data link CCDL 401.

This allows the evaluation, confirmation and consolidation of the sensor data to be performed completely independently and parallel, while the sequencer control unit 408 inscribes sensor data or calculated data into the link RAM memory 403, for instance, or reads such data out of it or causes such data to be transmitted via the cross channel data link CCDL 401, and so forth.

To enable adapting the specialized vote accelerator circuit configuration 406 to existing hardware of the flight control computer FCC, this specialized circuit configuration has two independent bus systems: One bus system 409, 410 is connected to the address bus or data bus of the link RAM memory 403, and the second bus system 411, 412 is connected to the address bus or data bus of the sequencer RAM memory 405.

The specialized vote accelerator circuit configuration in the present embodiment is a processor/controller based on microprogrammable bit slice processor elements or arithmetic-logic units (ALU). This concept combines the advantages of a processor with a fixed command set, namely
pretested hardware,
easily variable micro code,
structured programs,
with the advantages of a discrete-structured logic, namely
high speed,
parallel processing, and
specialized reduced instruction set.

We claim:

1. A method for forming an evaluation signal (YM) representing a parameter, which comprises:
   a) obtaining a plurality of measurement signals (X1, X2, X3, X4) from a plurality of sensors detecting a parameter within a time interval;
   b) supplying each measurement signal (X1, X2, X3, X4) to a plurality of evaluation units;
   c) forming an evaluation signal (YM1, YM2, YM3, YM4) in accordance with an evaluation algorithm with each evaluation unit;
   d) delivering each evalution signal (YM1, YM2, YM3, YM4) to a plurality of confirmation units;
   e) forming a confirmed evaluation signal (YD1, YD2, YD3, YD4) in accordance with a confirmation algorithm in each confirmation unit;
   f) supplying the confirmed evaluation signals (YD1, YD2, YD3, YD4) to respective processing units, and producing control signals (YC1, YC2, YC3, YC4) with the processing units; and
   g) controlling a plurality of actuators for controlling one and the same control variable with the control signals (YC1, YC2, YC3, YC4).

2. The method according to claim 1, which further comprises detecting the measurement values simultaneously.

3. The method according to claim 1, which further comprises forming filtered measurement signals (Y1, Y2, Y3, Y4) from the measurement signals (X1, X2, X3, X4) prior to forming the evaluation signal.

4. The method according to claim 1, which further comprises determining a value range having a maximum and a minimum value, and excluding measurement signals (X1, X2, X3, X4) from the evaluation algorithm, having values outside the value range over a given period of time.

5. The method according to claim 4, which further comprises marking the excluded measurement signals as error signals.

6. The method according to claim 4, which further comprises determining a maximally allowable deviation value, and excluding measurement signals (X1, X2, X3, X4) from the evaluation algorithm and marking measurement signals as error signals, having values deviating from an evaluation signal (YM1, YM2, YM3, YM4) by more than the deviation value.

7. The method according to claim 1, which further comprises determining a value range having a maximum and a minimum value, determining a maximally allowable deviation value, and excluding measurement signals (X1, X2, X3, X4) from the evaluation algorithm and marking measurement signals as error signals, having values outside the value range over a given period of time and deviating from an evaluation signal (YM1, YM2, YM3, YM4) by more than the deviation value.

8. The method according to claim 1, which comprises selecting four usable measurement signals (X1, X2, X3, X4), the evaluation algorithm consisting of ignoring the smallest and largest measurement signals, and evaluating a mean value from two remaining measurement signals.

9. The method according to claim 1, which comprises selecting three usable measurement signals (X1, X2, X3, X4), the evaluation algorithm consisting of ignoring the smallest and largest measurement signals, and forming the evaluation signal from the remaining measurement signal.

10. The method according to claim 1, which comprises selecting two usable measurement signals (X1, X2, X3, X4), and wherein the evaluation algorithm includes forming a mean value from the two measurement signals.

11. The method according to claim 1, which comprises selecting one usable measurement signal (X1, X2, X3, X4), and wherein the evaluation algorithm includes forming the evaluation signal (YM1, YM2, YM3, YM4) from the selected measurement signal.

12. The method according to claim 1, which further comprises determining a maximally allowable deviation value, and excluding evaluation signals (YM1, YM2, YM3, YM4) from the confirmation algorithm, having values deviating from a confirmed evaluation signal (YD1, YD2, YD3, YD4) by more than the deviation value over a given period of time.

13. The method according to claim 12, which further comprises marking the excluded evaluation signals as error signals.

14. The method according to claim 1, which further comprises selecting at least two equal evaluation signals (YM1, YM2, YM3, YM4), and wherein the confirmation algorithm includes forming a confirmed evaluation signal (YD1, YD2, YD3, YD4) from two selected evaluation signals (YM1, YM2, YM3, YM4).

15. The method according to claim 1, which further comprises selecting two pairs of equal evaluation signals, the values of the pairs being different from one another, and wherein the confirmation algorithm includes forming a confirmed evaluation signal (YD1, YD2, YD3, YD4) from one of the pairs.

16. The method according to claim 1, which further comprises selecting two pairs of equal evaluation signals, the values of the pairs being different from one another, and wherein the confirmation algorithm includes forming a confirmed evaluation signal (YD1, YD2, YD3, YD4) from a mean value between the pairs.

17. The method according to claim 1, which further comprises comparing the evaluation signals (YM1, YM2, YM3, YM4), and forming a confirmation algorithm of retaining the most recently confirmed evaluation signal (YD1, YD2, YD3, YD4), if all of the evaluation signals (YM1, YM2, YM3, YM4) are dissimilar.

18. The method according to claim 1, which further comprises supplying each control signal (YC1, YC2, YC3, YC4) to a plurality of consolidation units, and forming the algorithm of forming respective consolidated output signals (CMD1, CMD2, CMD3, CMD4) with the consolidation units.

19. The method according to claim 18, which further comprises determining a maximally allowable deviation value, and excluding control signals (YC1, YC2, YC3, YC4) from the consolidation algorithm, having values deviating from a consolidated output signal (CMD1, CMD2, CMD3, CMD4) by more than the deviation value over a given period of time.

20. The method according to claim 19, which further comprises marking the excluded control signals as error signals.

21. The method according to claim 18, which further comprises selecting at least two equal control signals (YC1, YC2, YC3, YC4), forming the consolidation algorithm of forming a consolidated output signal (CMD1, CMD2, CMD3, CMD4) from two selected control signals (YC1, YC2, YC3, YC4).

22. The method according to claim 18, which further comprises selecting two pairs of equal control signals (YC1, YC2, YC3, YC4), the values of the pairs being different from one another, and forming the consolidation algorithm of forming a consolidated output signal (CMD1, CMD2, CMD3, CMD4) from one of the pairs.

23. The method according to claim 18, which further comprises selecting two pairs of equal control signals (YC1, YC2, YC3, YC4), the values of the pairs being different from one another, and forming the consolidation algorithm of forming a consolidated output signal (CMD1, CMD2, CMD3, CMD4) from a mean value between the pairs.

24. The method according to claim 18, which further comprises comparing the control signals (YC1, YC2, YC3, YC4), and forming a consolidation algorithm of retaining the most recently consolidated output signal (CMD1 CMD2, CMD3, CMD4), if all of the control signals (YC1, YC2, YC3, YC4) are dissimilar.

25. The method according to claim 18, which further comprises controlling a plurality of actuators for controlling one and the same control variable with a plurality of the consolidated output signals (CMD1, CMD2, CMD3, CMD4).

26. The method according to claim 25, which further comprises controlling a control variable in the form of a control variable of an aircraft.

27. The method according to claim 1, which further comprises comparing the control signals (YC1, YC2, YC3, YC4), to a plurality of consolidation units, and forming the algorithm of forming respective consolidated output signals (CMD1, CMD2, CMD3, CMD4) with the consolidation units.

28. The method according to claim 27, which further comprises determining a maximally allowable deviation value, and excluding control signals (YC1, YC2, YC3, YC4) from the consolidation algorithm, having values deviating from a consolidated output signal (CMD1, CMD2, CMD3, CMD4) by more than the deviation value over a given period of time.

29. The method according to claim 29, which further comprises marking the excluded control signals as error signals.

30. The method according to claim 27, which further comprises selecting at least two equal control signals (YC1, YC2, YC3, YC4), forming the consolidation algorithm of forming a consolidated output signal (CMD1, CMD2, CMD3, CMD4) from two selected control signals (YC1, YC2, YC3, YC4).

31. The method according to claim 27, which further comprises selecting two pairs of equal control signals (YC1, YC2, YC3, YC4), the values of the pairs being different from one another, and forming the consolidation algorithm of forming a consolidated output signal (CMD1, CMD2, CMD3, CMD4) from one of the pairs.

32. The method according to claim 27 which further comprises selecting two pairs of equal control signals (YC1, YC2, YC3, YC4), the values of the pairs being different from one another, and forming the consolidation algorithm of forming a consolidated output signal (CMD1, CMD2, CMD3, CMD4) from a mean value between the pairs.

33. The method according to claim 27, which further comprises comparing the control signals (YC1, YC2, YC3, YC4), and forming a consolidation algorithm of retaining the most recently consolidated output signal (CMD1 CMD2, CMD3, CMD4), if all of the control signals (YC1, YC2, YC3, YC4) are dissimilar.

34. The method according to claim 1, which further comprises performing at least steps a) to c) with a specialized hard-wired circuit.

35. The method according to claim 34, which further comprises performing steps b) and c) with a circuit in the form of a user-specific integrated circuit.

36. The method according to claim 1, which further comprises controlling a control variable in the form of a control variable of an aircraft.

37. The method according to claim 1, which further comprises detecting one flight parameter of an aircraft with the plurality of sensors.

38. A circuit configuration for forming an evaluation signal (YM) representing a parameter in accordance with an evaluation algorithm from a plurality of measurement signals (X1, X2, X3, X4), comprising a plurality of sensors detecting the parameter within a time interval and generating the measurement signals; a plurality of evaluating units each forming one evaluation signal (YM1, YM2, YM3, YM4) in accordance with the evaluation algorithm from the measurement signals (X1, X2, X3, X4); a plurality of confirmation units for forming confirmation signals from evaluation signals, each of said confirmation units receiving a respective evaluation signal (YM1, YM2, YM3, YM4) and including means for forming a respective confirmed evaluation signal (YD1, YD2, YD3, YD4) in accordance with one confirmation algorithm; a plurality of processing units for forming respective control signals (YC1, YC2, YC3, YC4) from respective confirmed evaluation signals (YD1, YD2, YD3, YD4); and means for supplying the control signals (YC1, YC2, YC3, YC4) to a plurality of actuators for controlling one and the same control variable.

39. The circuit configuration according to claim 38, wherein said sensors operate simultaneously.

40. The circuit configuration according to claim 38, including means for forming filtered measurement signals from the measurement signals.

41. The circuit configuration according to claim 38, wherein said evaluation units include means for excluding measurement signals (X1, X2, X3, X4) from the evaluation algorithm having values outside a given value range over a predetermined period of time.

42. The circuit configuration according to claim 41, wherein said evaluation units include means for marking excluded measurement signals as error signals.

43. The circuit configuration according to claim 38, wherein said evaluation units include means for selecting four usable measurement signals (X1, X2, X3, X4), ignoring the smallest and largest measurement signals (X1, X2, X3, X4), and for forming a mean value from the two remaining measurement signals.

44. The circuit configuration according to claim 38, wherein said evaluation units include means for selecting three usable measurement signals (X1, X2, X3, X4), ignoring the smallest and largest measurement signals (X1, X2, X3, X4), and for forming the evaluation signal from the remaining measurement signal.

45. The circuit configuration according to claim 38, wherein said evaluation units include means for selecting two usable measurement signals (X1, X2, X3, X4), and for forming a mean value from the two measurement signals.

46. The circuit configuration according to claim 38, wherein said evaluation units include means for selecting one usable measurement signals (X1, X2, X3, X4), and for forming the evaluation signal from the selected measurement signal.

47. The circuit configuration according to claim 38, wherein said confirmation units include means for excluding evaluation signals (YM1, YM2, YM3, YM4) from the confirmation algorithm having values outside a given value range over a predetermined period of time.

48. The circuit configuration according to claim 47, wherein said confirmation units include means for marking excluded evaluation signals as error signals.

49. The circuit configuration according to claim 38, wherein said confirmation units include means for selecting at least two equal evaluation signals (YM1, YM2, YM3, YM4), and for forming a confirmed evaluation signal (YD1, YD2, YD3, YD4) from two selected evaluation signals (YM1, YM2, YM3, YM4).

50. The circuit configuration according to claim 38, wherein said confirmation units include means for selecting two pairs of equal evaluation signals, the values of the pairs being different from one another, and for forming a confirmed evaluation signal (YD1, YD2, YD3, YD4) from at least one of the pairs.

51. The circuit configuration according to claim 38, wherein said confirmation units include means for comparing the evaluation signals, and for retaining the most recently confirmed evaluation signal (YM1 YM2, YM3 YM4) if all of the evaluation signals are dissimilar.

52. The circuit configuration according to claim 38, including a plurality of consolidation units for forming consolidated output signals from said control signals, each of said consolidation units receiving a respective control signal (YC1, YC2, YC3, YC4), and including means for forming a respective consolidated output signal (CMD1, CMD2, CMD3, CMD4) in accordance with one consolidation algorithm.

53. The circuit configuration according to claim 52, wherein said consolidation units include means for excluding control signals (YC1, YC2, YC3, YC4) from the consolidation algorithm having values outside a given value range over a predetermined period of time.

54. The circuit configuration according to claim 53, wherein said consolidation units include means for marking excluded control signals as error signals.

55. The circuit configuration according to claim 52, wherein said consolidation units include means for selecting at least two equal control signals (YC1, YC2, YC3, YC4), and for forming a consolidation output signal (CMD1, CMD2, CMD3, CMD4) from two selected control signals.

56. The circuit configuration according to claim 52, wherein said consolidation units include means for selecting two pairs of equal control signals, the values of the pairs being different from one another, and for forming a consolidated output signal (CMD1, CMD2, CMD3, CMD4) in a defined manner from at least one of the pairs.

57. The circuit configuration according to claim 52, wherein said consolidation units include means for comparing the control signals, and for retaining the most recently consolidated output signal (CMD1, CMD2, CMD3, CMD4) if all of the output signals are dissimilar.

58. The circuit configuration according to claim 52, including means for supplying a plurality of consolidated output signals (CMD1, CMD2, CMD3, CMD4) to a plurality of actuators for controlling one and the same control variable of an aircraft.

59. The circuit configuration according to claim 38, wherein said sensors detect one flight or control parameter of an aircraft.

60. The circuit configuration according to claim 38, including a vote accelerator in the form of a specialized hard-wired circuit, said vote accelerator being a processor and said evaluation units forming part of said vote accelerator.

61. The circuit configuration according to claim 60, wherein said vote accelerator consists of a plurality of vote accelerators, including a cross-channel data link (CCDL) for producing data connections among said vote accelerators.

62. The circuit configuration according to claim 61, wherein said evaluation units produce evaluation signals, including a sequence control unit having means for distributing the evaluation signals (YM1, YM2, YM3, YM4) among said vote accelerators via said cross channel data link (CCDL).

63. The circuit configuration according to claim 60, including at least one read-write memory.

64. The circuit configuration according to claim 63, wherein said read-write memory is a plurality of memories in the form of a link RAM, a voter RAM and a sequencer RAM having two respective inputs and outputs for memory access.

65. The circuit configuration according to claim 64, wherein said link RAM and said sequencer RAM having a respective address bus and a respective data bus, including a first bus system connected to said address and data busses of said link RAM, and a second bus system connected to said address and data busses of said sequencer RAM.

66. The circuit configuration according to claim 64, including a sequencer control unit having means for periodically writing the measurement signals (X1, X2, X3, X4) into said sequencer RAM.

67. The circuit configuration according to claim 64, including other vote accelerators, a sequencer control unit and a cross channel data link (CCDL), said sequencer control unit having means for distributing the measurement signals (X1, X2, X3, X4) via said cross channel data link (CCDL) into said link RAM associated with the other vote accelerators.

68. The circuit configuration according to of claim 67, wherein said sequencer control unit includes means for reading measurement signals (X1, X2, X3, X4) from said link RAM associated with said cross channel data link (CCDL).

69. The circuit configuration according to claim 68, wherein said sequencer control unit includes means for initiating an evaluation algorithm, and for writing the results of the evaluation algorithm into said sequencer RAM.

70. The circuit configuration according to claim 38, including a vote accelerator in the form of a specialized hard-wired circuit, said vote accelerator being a processor and said evaluation units and said confirmation units forming part of said vote accelerator.

71. The circuit configuration according to claim 38, including a vote accelerator in the form of a specialized hard-wired circuit, said vote accelerator being a processor and said evaluation, confirmation and processing units forming part of said vote accelerator.

72. The circuit configuration according to claim 71, wherein said hard-wired circuit is in the form of a user-specific integrated circuit.

73. The circuit configuration according to claim 71, including a master computer (FCC) connected to said vote accelerator for performing evaluation, confirmation and consolidation functions.

74. The circuit configuration according to claim 73, wherein said vote accelerator performs the evaluation, confirmation and consolidation functions autonomously of said master computer.

75. The circuit configuration according to claim 74, wherein said master computer is a flight control computer, further including a sequencer control unit for controlling the circuit configuration autonomously of the flight control computer (FCC).

76. The circuit configuration according to claim 71, wherein said vote accelerator is a processor-controller formed of microprogrammable bit slice processor elements.

77. The circuit configuration according to claim 71, wherein said vote accelerator is a processor-controller formed of arithmetic logic units (ALU).

78. A circuit configuration for forming an evaluation signal (YM) representing a measurement variable in accordance with an evaluation algorithm from a plurality of measurement signals (X1, X2, X3, X4), comprising an evaluation unit, a confirmation unit, and a consolidation unit, said units forming a single aggregate unit, including a cross channel data link (CCDL), a sequencer control unit having means for performing the operations of reading data, writing data and transmitting data via said cross channel data link (CCDL), and further including a vote accelerator interconnecting said evaluation, confirmation and consolidation units and operating said evaluation, confirmation and consolidation units substantially simultaneously to the operations by said sequencer control unit.

* * * * *